United States Patent [19]

Setaka et al.

[11] Patent Number: 4,881,414

[45] Date of Patent: Nov. 21, 1989

[54] TORQUE DETECTION APPARATUS

[75] Inventors: Yousuke Setaka, Anjo; Sumio Yanase, Okazaki; Kanji Takeuchi, Gamagori; Masahiko Miyahara, Chiryu, all of Japan

[73] Assignee: Nippondenso Co., Ltd., Kariya, Japan

[21] Appl. No.: 192,187

[22] Filed: May 10, 1988

[30] Foreign Application Priority Data

May 12, 1987 [JP] Japan .................. 62-115271

[51] Int. Cl.$^4$ .............................. G01L 3/10
[52] U.S. Cl. .................. 73/862.33; 324/208; 336/135
[58] Field of Search ............ 73/862.33; 336/135, 336/30; 324/208

[56] References Cited

U.S. PATENT DOCUMENTS

| | | | |
|---|---|---|---|
| 1,354,698 | 10/1920 | Shallcross | 73/862.33 |
| 2,826,064 | 3/1958 | Hastings | 73/862.33 |
| 3,045,196 | 7/1962 | Packard | 336/135 |
| 3,172,063 | 3/1965 | Lindstrom et al. | 336/30 X |
| 4,356,732 | 11/1982 | Hachtel et al. | 73/862.33 |
| 4,712,433 | 12/1987 | Hochstein et al. | 73/862.33 X |

FOREIGN PATENT DOCUMENTS

| | | |
|---|---|---|
| 55-36354 | 3/1980 | Japan . |
| 61-223525 | 10/1986 | Japan . |
| 62-4672 | 1/1987 | Japan . |
| 63-36124 | 2/1988 | Japan . |

OTHER PUBLICATIONS

"Noncontact Torque Sensor", by Ichiro Sasada et al; IEEE 1985 IECON'85, pp. 73-79.

Primary Examiner—Charles A. Ruehl
Attorney, Agent, or Firm—Cushman, Darby & Cushman

[57] ABSTRACT

A torque detection apparatus for measuring a torque applied between a drive shaft and an output shaft which is applicable to an electric power steering system of a motor vehicle. The torque detection apparatus is provided between the drive and output shafts and comprises first and second rotating bodies which are respectively at one end portions coupled fixedly to the drive and output shafts, the first rotating body being rotatable in accordance with rotation of the drive shaft and the second rotating body being rotatable in accordance with rotation of said output shaft. The first and second rotating bodies are shaped cylindrically and the first rotating body has on its outer circumferential surface magnetic toothed portions and the second rotating body has on its inner circumferential surface magnetic toothed portions. The first and second rotating bodies are disposed coaxially so that the magnetic toothed portions are magnetically engaged with each other so as to form a first magnetic flux path and a second magnetic flux path. The torque between the drive and output shafts is measured on the basis of the difference between the amounts of the magnetic fluxes passing through the first and second magnetic flux paths.

5 Claims, 9 Drawing Sheets

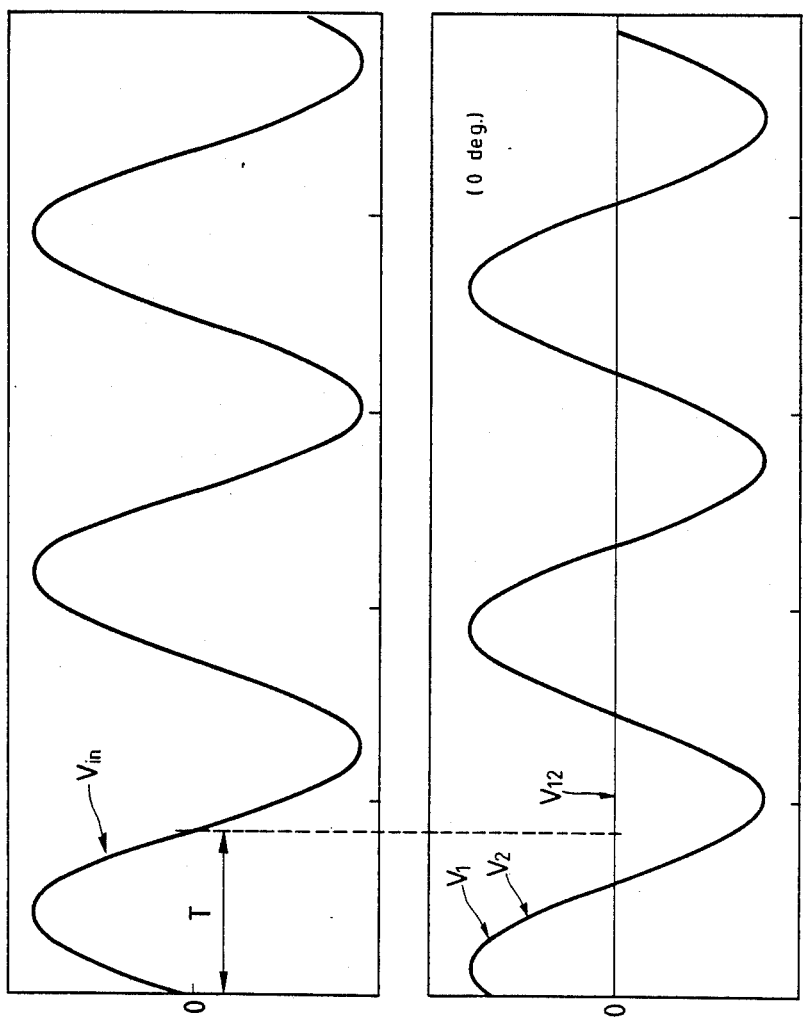

TORQUE DETECTION APPARATUS

BACKGROUND OF THE INVENTION

The present invention relates generally to a torque detection apparatus, and more particularly to such a torque detection apparatus arranged so as to measure the magnitude of a torque on the basis of a relative rotational displacement of a driven shaft with respect to a drive shaft. The present invention may be employed, for example, in an electric power steering system for electrically power-assisting a steering device of a motor vehicle by means of an electric motor.

Hydraulic power steering systems, generally known as power steering systems, are operated by using hydraulic pressure. There are problems which arise with this type of power steering system, however, in that the mounting position thereof on a vehicle is limited because of provision of hydraulic-pressure pipes and further in that there is the possibility of oil leakage from the hydraulic pressure pipes. A further problem arising in such a hydraulic power steering system relates to an increase in the amount of fuel consumption because a hydraulic pressure pump is always driven irrespective of steering operation. Recently, taking into account the above-mentioned problems, electric power steering systems have been developed to electrically effect the power-assistance of the steering by the aid of an electric motor, the electric motor being driven by means of a control circuit only in response to operation of a steering wheel of the vehicle, thus resulting in free selection of the mounting position and improvement of the fuel consumption. This electric power steering system further allows easy and appropriate control of the production torque in correspondence with variation of the vehicle speed by control of the supply current to the electric motor. On the other hand, an important problem in such an electric power steering system relates to the need for provision of an apparatus which can accurately detect a torque produced with respect to a steering shaft. One known technique is a stain-gauge type torque detection apparatus in which the torque detection is made with a sensor being brought into direct contact with a rotational shaft of the vehicle. This type of the detection apparatus, however, causes reduction of stability and reliability on the detection because of direct contact with the rotational shaft. Another known technique involves detection of variation of a magnetic permeability with stress variation occurring due to the load torque. Apparatus of this type results in that difficulty is encountered when attempting to accurately measure the torque because of a small sensor output and influence to the output characteristic due to temperature. A further known system is of the phase-difference type, as disclosed in Japanese Patent Provisional Publication No. 61-223525, in which a rotational displacement between two rotating bodies due to a torsion is detected with a torsion bar being interposed therebetween. However, in this system, the measurement of the torque is allowed only under the condition that the rotating bodies are in the rotating states and therefore difficulty is encountered to measure a static torque. Japanese Utility Model Provisional Publication No. 55-36354 discloses a still further type of torque detection apparatus. However, this type of apparatus is arranged to measure a torsion amount on the basis of the absolute value of a magnetic flux density which is varied in accordance with torsion variation, and therefore the output to be obtained is also small.

Thus, a further improvement would be required from the viewpoint of improvement of reliability, size-reduction, accuracy of measurement of a static torque, and so on.

SUMMARY OF THE INVENTION

The present invention has been developed in order to remove the drawbacks inherent to the conventional torque detection apparatus.

It is therefore an object of the present invention to provide a torque detection apparatus which is capable of accurately detecting both rotational and static torques concurrently with apparatus size-reduction.

With this and other objects which will be become apparent as the description proceeds, a torque detection apparatus according to the present invention, being provided between first and second shafts which oppose one another so that their axes are coincident with each other for measuring a torque applied therebetween, comprises a first rotating body coupled to the first shaft so as to be rotatable in accordance with rotation of the first shaft and a second rotating body coupled to the second shaft so as to be rotatable in accordance with rotation of the second shaft, the second rotating body being closely positioned with respect to the first rotating body so that a predetermined space is formed therebetween. Also included in the torque detection apparatus is a magnetic field supply means for causing a magnetic flux to flow through a first magnetic flux path which runs from a portion of the first rotating body through the predetermined space to a portion of the second rotating body and for further causing a magnetic flux to flow through a second magnetic flux path which runs from another portion of the first rotating body through the predetermined space to another portion of the second rotating body. Magnetic flux changing means is engaged with the first and second rotating bodies so as to change the amounts of the magnetic fluxes flowing through the first and second magnetic flux paths in accordance with a relative rotational displacement occurring between the first and second shafts. Signal generating means is also provided for generating a signal indicative of the difference between the amount of the magnetic flux flowing through the first magnetic flux path and the amount of the magnetic flux flowing through the second magnetic flux path, the signal being used to detect the torque applied between the first and second shafts. Preferably, magnetic flux changing means includes first and second toothed means which are provided for the first magnetic flux path and further includes third and fourth toothed means which are provided for the second magnetic flux path, the first and second toothed means being mounted on said first and second rotating bodies, respectively, and the third and fourth toothed means being mounted on the first and second rotating bodies, respectively, the first and second toothed means respectively having pluralities of tooth portions and ones of which are positioned to be in opposed relation to each other and the third and fourth toothed means respectively having pluralities of tooth portions and ones of which are positioned to be in opposed relation to each other, the increase and decrease of the magnetic fluxes flowing through the first and second magnetic flux paths being affected in accordance with the positioning relations between the pluralities of tooth portions of the first and second toothed means and between said pluralities of tooth portions of the third and fourth toothed means which depends upon the degree of the relative rotational displacement occurring between the first and second rotating bodies.

That is, the torque detection apparatus according to the present invention is arranged so as to form two magnetic circuits and to measure the torque between the first and second shafts on the basis of the difference of the magnetic fluxes flowing through the first and second magnetic circuits, thus resulting in obtaining a high output irrespective of size-reduction. Furthermore, since the space formed between the first and second rotating bodies is entirely used for magnetic coupling, even if the space becomes irregular in width due to a radial load applied between the first and second shafts, the variation of the magnetic resistance can be measured accurately, resulting in improvement of reliability.

BRIEF DESCRIPTION OF THE DRAWINGS

The present invention will be described in further detail with reference to the accompanying drawings, in which:

FIGS. 8 to 10 are graphic illustrations for describing the relations between exciting voltages and output voltages;

DETAILED DESCRIPTION OF THE INVENTION

Figure 1:
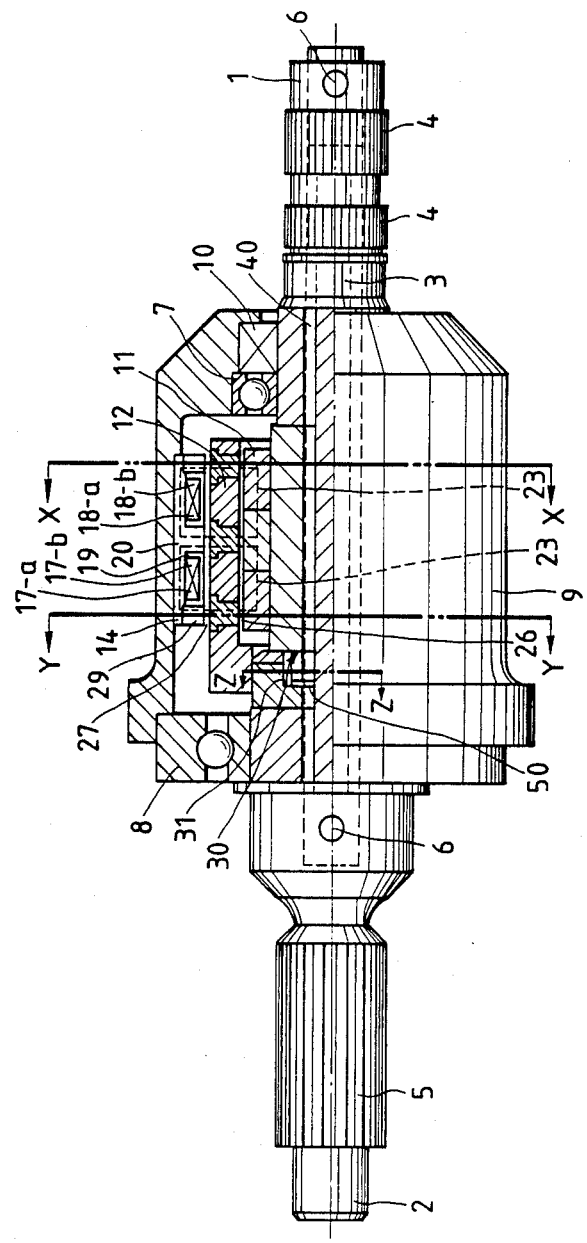
FIG. 1 is a partial cross-sectional view showing a torque detection apparatus according to an embodiment of the present invention.

Referring now to FIG. 1, there is illustrated a torque detection apparatus according to an embodiment of the present invention which is incorporated into an electric power steering system of a motor vehicle. In FIG. 1, illustrated at numeral 1 is a first shaft, i.e., drive shaft, to which a rotational driving force is applied and which has involute serration portions 4 and is coupled through a universal joint, not shown, to a steering wheel of the motor vehicle. Illustrated at numeral 2 is a second shaft, i.e., output shaft, which has a helical gear portion 5 to be engaged with a rack, not shown, so as to drive wheels of the motor vehicle. Both the driving and output shafts 1 and 2 are supported by bearings 7, 8, respectively, to be rotatable about their axes and arranged to be at a facing section 50 in separately opposed relation to each other with a predetermined distance therebetween. The drive and output shafts 1 and 2 have elongated holes 40 which are defined along the axes thereof and in which a torsion bar 3 is inserted thereinto so as to connect the drive shaft 1 to the output shaft 2, both end portions of the torsion bar 3 being fixedly secured to both the drive and output shafts 1 and 2 by means of pins 6. This torsion bar 3 is twisted between both the driving and output shafts 1 and 2 to detect a torque on the basis of the torsion angle. A housing 9 is fixedly secured to a vehicle side rack housing, not shown, and an oil seal portion 10 is provided in order to prevent introduction of water and so on thereinto.

On the drive shaft 1 is fixed an inner rotor, i.e., first rotating body, 11 which makes up a magnetic circuit and on the output shaft 2 is fixed an outer rotor, i.e., second rotating body, 12. The inner and outer rotors 11 and 12 are positioned vertically so as to oppose one another and have a predetermined space 26 being formed therebetween. Furthermore, at the outside of the outer rotor 12 a stator 14 is provided, having exciting coils 17-a and 18-a and detection coils 17-b and 18-b, with a predetermined space 27 being formed therebetween. The stator 14 is constructed as a differential transformer which acts as a magnetic field supply means and a signal generating means.

Figure 2:
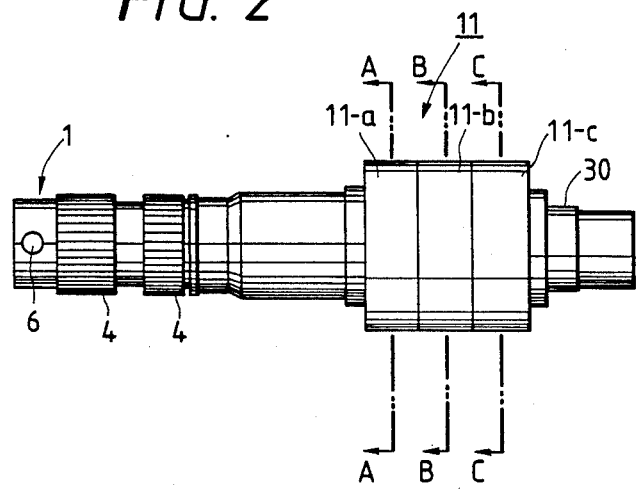
FIG. 2 is an illustration of an arrangement of an inner rotor.
Figure 3A:
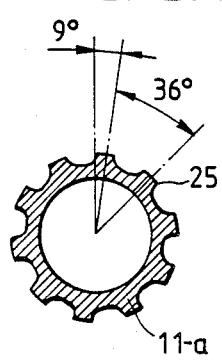
FIGS. 3A, 3B, and 3C are cross-sectional views taken along lines A—A, B—B and C—C in FIG. 2.
Figure 3B:
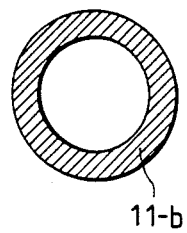
Figure 3C:
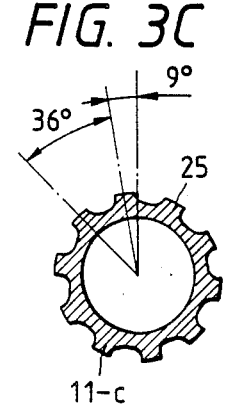

As shown in FIG. 2, the inner rotor 11 fixedly secured to the drive shaft 1 comprises three magnetic bodies 11-a, 11-b, and 11-c whose cross-sections taken along lines A—A, B—B and C—C in FIG. 2 are illustrated respectively in FIGS. 3A, 3B, and 3C. The magnetic bodies 11-a and 11-c have at their circumferences equally spaced tooth portions 25, respectively, which are arranged to have a difference of ½ pitch from each other. On the other hand, the magnetic member 11-b is ring-shaped and does not have tooth portions at its circumference. The diameters of the respective magnetic bodies 11-a, 11-b and 11-c are arranged to be equal in dimension to each other. In this embodiment, the number of the tooth portions 25 is 10 to provide the pitch of 36° which may be a value corresponding to over 2 times the maximum torsion angle of the torsion bar 3 which has an elastic member. The maximum torsion angle is an angle determined by a stopper which will be described hereinafter.

Figure 4:
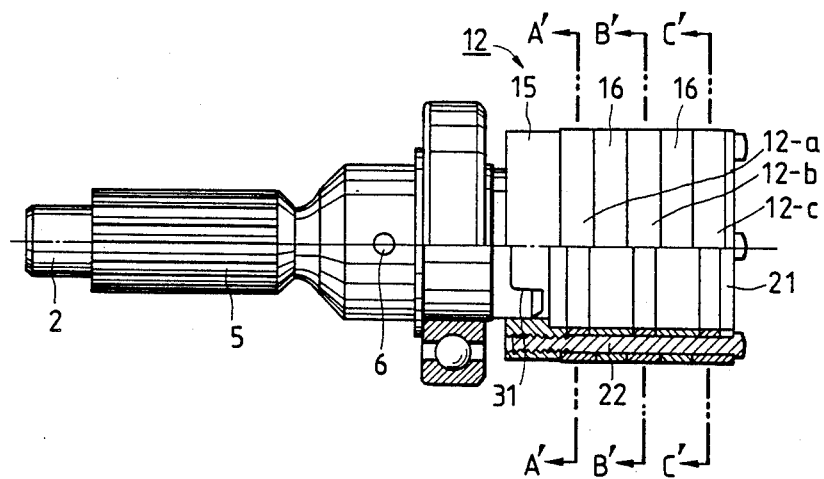
FIG. 4 is an illustration of an arrangement of an outer rotor.
Figure 5A:
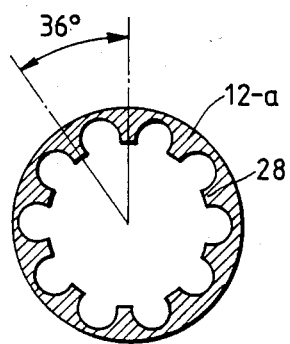
FIGS. 5A to 5C are cross-sectional views taken along lines A'—A', B'—B' and C'—C' in FIG. 4.
Figure 5B:
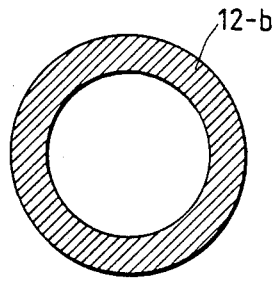
Figure 5C:
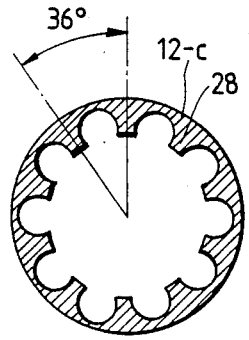

FIG. 4 is a partial cross-sectional view showing an arrangement of the outer rotor 12. In FIG. 4, the outer, rotor 12 is fixedly secured through screws 22 and plates 21 to a ring-shaped member 15 fixedly secured to the output shaft 2. The outer rotor 12 is composed of three magnetic bodies 12-a, 12-b, 12-c and non-conductive, non-magnetic spacers 16 provided between the three magnetic bodies 12-a, 12-b, and 12-c. The cross-sections of the three magnetic bodies 12-a, 12-b, and 12-c taken along lines A'—A', B'—B', and C'—C' in FIG. 4 are illustrated in FIGS. 5A, 5B, and 5C. The magnetic bodies 12-a and 12-c respectively have tooth portions 28 which are provided to be in opposed relation of the tooth portions of the magnetic bodies 11-a and 11-c of the inner rotor 11, their pitch being 36° which is equal to that of the inner rotor 11. The phases of the tooth portions 28 of the magnetic bodies 12-a and 12-c are coincident with each other. The magnetic body 12-b is shaped in form of a ring so that its inner and outer diameters are equal in dimension to those of each of the magnetic bodies 12-a and 12-c. The spacers 16 are provided so as to prevent shorts between magnetic paths.

The stator 14, as shown in FIG. 1, comprises the exciting coils 17-a, 18-a, the detection coils 17-b, 18-b, bobbins 19 and cores 20, 29 of a substantially E-shaped cross-section. The exciting coil 17-a, detection coil 17-b and the exciting coil 18-a and detection coil 18-b are independently wound on the bobbins 19 such that the axes of the respective coils and the axis of the drive shaft 1 are coincident with each other. The cores 20, 29, forming a magnetic circuit, are located on the inner circumferential surface of the housing 9. In response to current flowing through the exciting coils 17-a, and 18-a two magnetic circuits 23 are formed therein. At this time, due to the tooth portions 25, 28 of the inner and outer rotors 11, 12 and due to the relative positioning thereof, the degree of magnetic coupling varies in the space 26, that is, the output voltages or the detection coils 17-b and 18-b vary because the magnetic resistance of the magnetic path in the space 26 is varied when the relative position of the tooth portions 28 to the tooth portions 25 changes in the space 26 and the magnetic flux passing through the magnetic resistance varies so that the magnetic flux and the detection coils cross each other.

Figure 11:
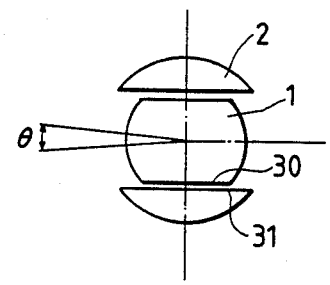
FIG. 11 shows an arrangement of a stopper device for limiting the torsion angle of a torsion bar provided between a drive shaft and an output shaft.

As shown in FIGS. 2 and 4, further along the drive and output shafts 1 and 2 are stoppers 30 and 31 which, as understood from FIG. 11, come into contact with each other when the torsion bar 3 is twisted by a predetermined angle so as to restrict the twisting amount thereof so that a torque is allowed to be directly transmitted from the drive shaft 1 to the output shaft 2. FIG. 11 is a cross-sectional view showing the relation between the stoppers 30 and 31, taken along line Z-Z in FIG. 1. In FIG. 11, the rotational angle θ resulting in the contact of the stoppers 30 and 31 may be determined to be below ½ of the pitch of the tooth portions 25 and 28 of the inner and outer rotors 11 and 12 (i.e., below 18° in this embodiment). Here, while the outer and inner rotors 11 and 12 are rotated together with each other with the stoppers 30 and 31 being brought into contact with each other, the relative position relation between the tooth portions 28, 25 thereof is not varied thus resulting in no variations of the output voltages of the detection coils 17-b and 18-b of the stator 14. Such a mechanism comprising the stoppers 30 and 31 prevents an excessive and rapid torque from being applied to the torsion bar 3 and allows manual operation in case of failure of the system.

Figure 6:
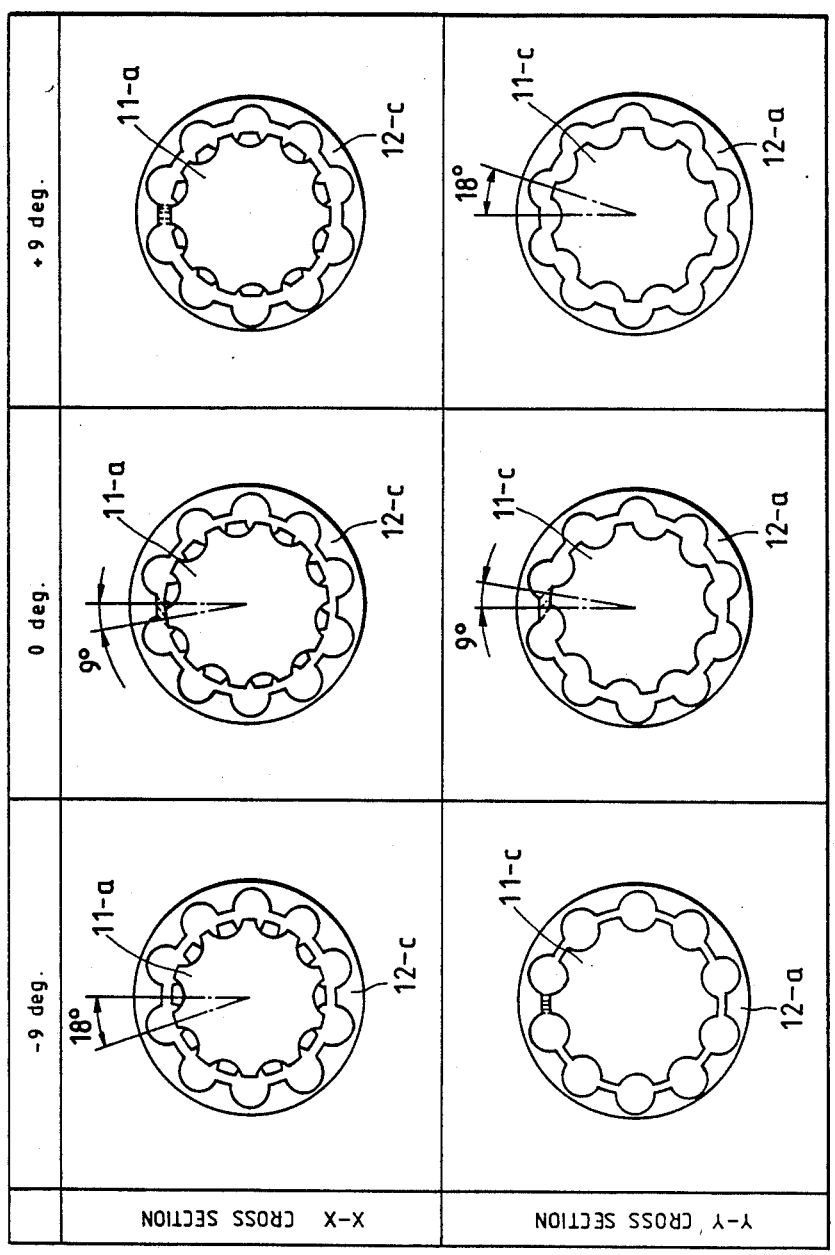
FIG. 6 are illustrations for describing the position relations between tooth portions of inner and outer rotors.

FIG. 6 shows cross-sections taken along line X-X and cross-sections taken along line Y-Y in FIG. 1 in order to describe variations of the relative position relation between the tooth portions 28, 25, based upon the relative torsion of the inner and outer rotors 11 and 12. Here, the windings and so on are omitted for only illustration. In the case of no torsion of the torsion bar 3 (0 deg.), in the X-X cross-section (one cross-sectional view of the space 26) the magnetic body 11-a of the inner rotor 11 is shifted counterclockwise by 9° with respect to the magnetic body 12-c of the outer rotor 12, and in the Y-Y cross-section (another cross-sectional view of the space 26) the magnetic body 11-c of the inner rotor 11 is shifted clockwise by 9° with respect to the magnetic body 12-a of the outer rotor 12. At this time, the degrees of the magnetic coupling in the cases of the X-X cross-section and the Y-Y cross-section are equal to each other. Thereafter, in response to the torsion bar 3 being twisted clockwise by 9° (+9 deg.), in the X-X cross-section the respective magnetic bodies are positioned so that the tooth portions are coincident in position with each other to obtain the maximum degree of magnetic coupling. Furthermore, in the Y-Y cross-section, the respective magnetic bodies are positioned so that the tooth portions of one of the magnetic bodies are in opposed relation to the concaved portions between the tooth portions of the other magnetic body to obtain the minimum degree of magnetic coupling. On the other hand, when shifted counterclockwise by 9° (−9 deg.), in the X-X cross-section the degree of magnetic coupling assumes a minimum and in the Y-Y cross-section the degree of magnetic coupling assumes a maximum. Here, in FIG. 6, the tooth portions of the magnetic bodies 11-a and 12-c. are arranged as first and second toothed means and the tooth portions of the magnetic bodies 11-c and 12-a are arranged as third and fourth toothed means.

Figure 7:
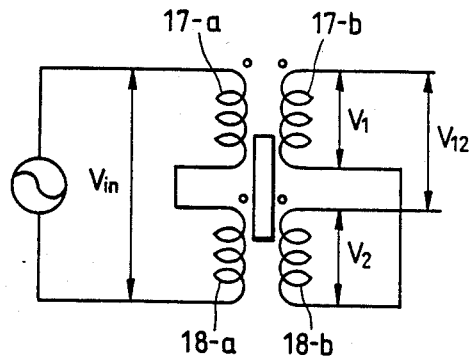
FIG. 7 shows the coupling relation between exciting coils and detection coils of a differential transformer.

FIG. 7 shows a wiring arrangement of the detection coils 17-b and 18-b which is similar to that of a conventional differential transformer. The exciting coils 17-a and 18-a are coincident in winding direction with each other and are coupled in series to each other, and the detection coils 17-b and 18-b obtain the differential output. Here, the exciting voltage is expressed with Vin, and the output voltages of the detection coils 17-b and 18-b are expressed with V1, V2, respectively, and the differential output voltage is expressed with V12.

Figure 9:
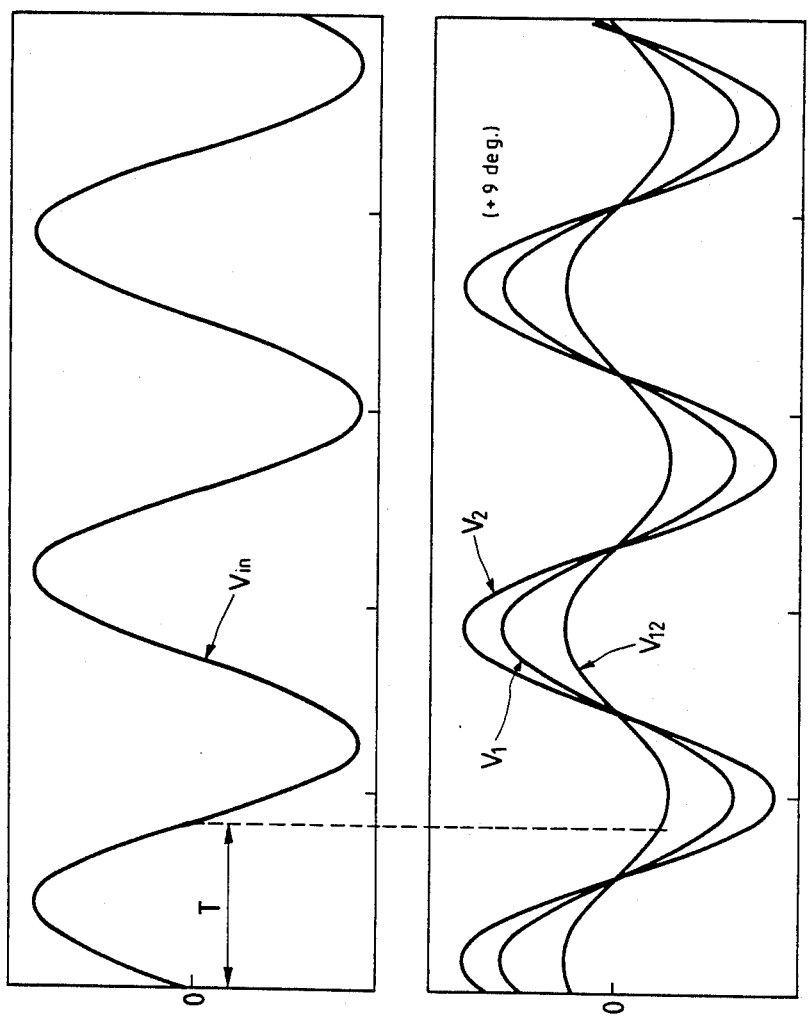
Figure 10:
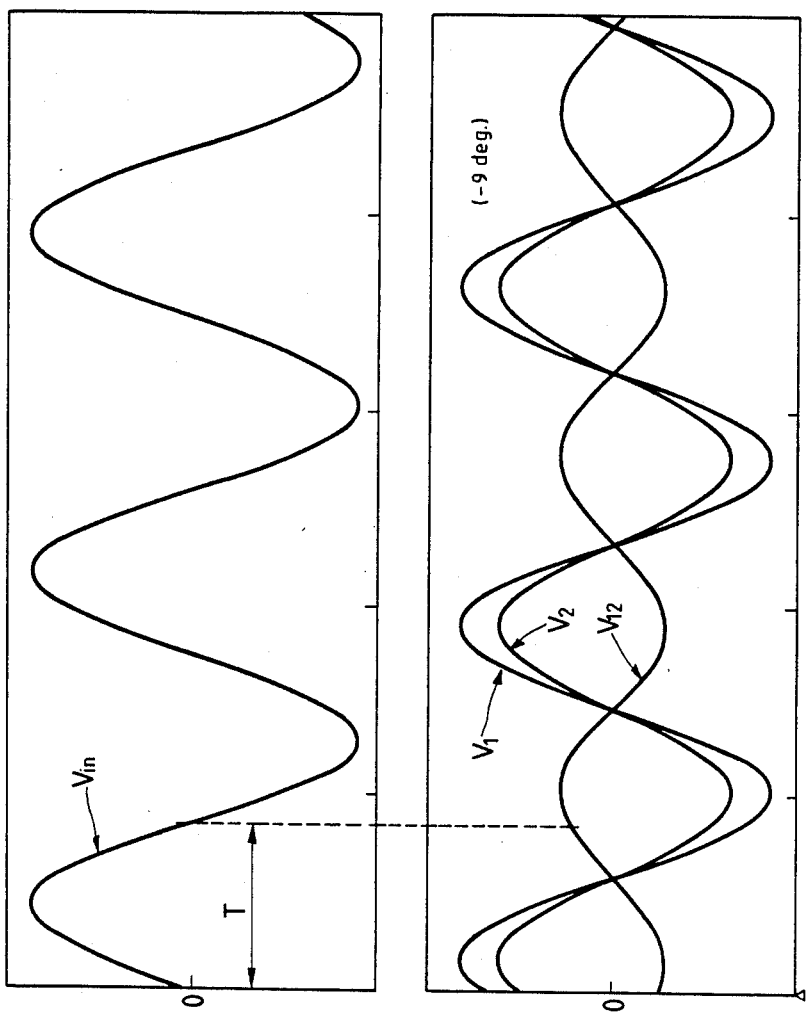

FIGS. 8 to 10 are illustrations of the output voltages in the position relations shown in FIG. 6. FIG. 8 shows the output voltage in the case of no torsion (0 deg.) where the upper illustration is for the exciting voltage Vin (sine wave voltage) and the lower illustration is for the respective output voltages V1, V2 and the differential output voltage V12. Since the magnetic circuit between the exciting coil 17-a and the detection coil 17-b and magnetic circuit between the exciting coil 18-a and the detection coil 18-b are equal in degree of magnetic coupling to each other, the differential output voltage assumes zero by cancelling.

FIG. 9 shows the case of torsion by 9° clockwise (+9 deg.). in the X-X cross-section, the degree of magnetic coupling becomes a maximum. That is, the output voltage V2 of the detection coil 18-b assumes the maximum and on the other hand the output voltage V1 of the detection coil 17-b assumes the minimum. At this time, the differential output voltage V12 is produced as shown in FIG. 9. FIG. 10 shows the case of torsion by 9° counterclockwise. In this case, the output voltage of the detection coil 17-b assumes the maximum and the output voltage V2 of the detection coil 18-b assumes the minimum and unlike the case of FIG. 9 the differential output voltage V12 is produced as shown in FIG. 10. With the torsion bar 3 being twisted due to generation of a torque, the amplitude and phase of the differential output voltage V12 varies in correspondence with the torsion angle. The magnitude and direction of the torque can be detected on the basis of the amplitude and direction thereof.

Figure 12:
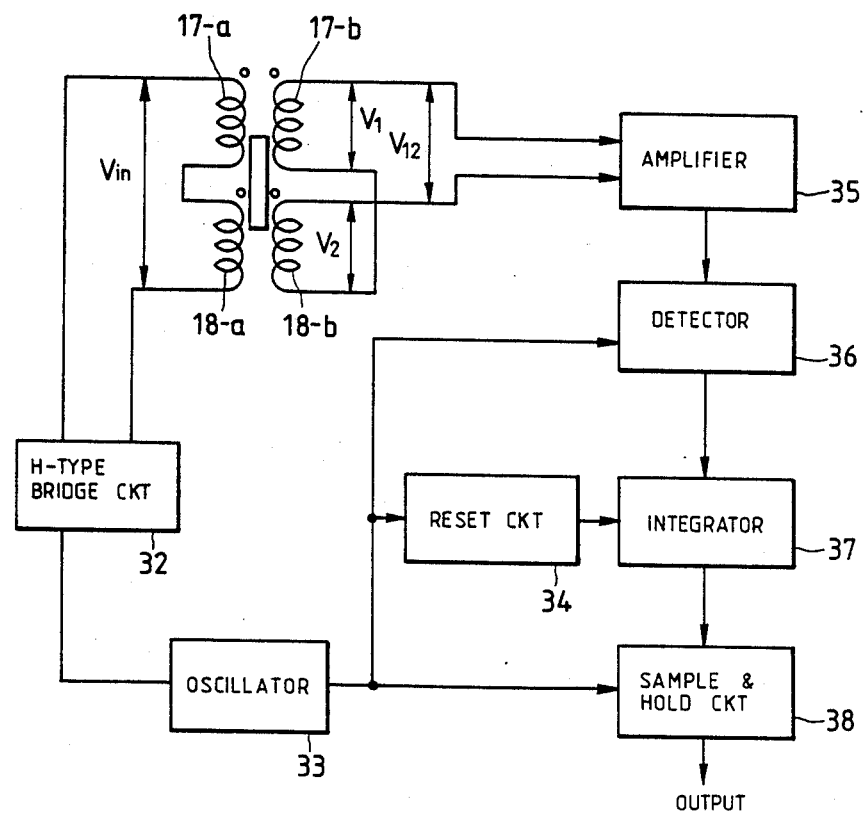
FIG. 12 is a block diagram showing an arrangement of a detection circuit for obtaining an output signal indicative of a torque to be measured.

FIG. 12 shows a detection circuit for processing the differential output voltage. This circuit is arranged so as to integrate the differential output voltage in synch with the exciting frequencies of the exciting coils 17-a and 18-a. The frequency of a H-type bridge circuit 32 for supply of a voltage to the exciting coils 17-a and 18-a is determined in accordance with the output of an oscillator 33. A portion of the differential output voltage amplified by an amplifier 35 s taken out by means of a synch detector 36 in synchronism with the output of the oscillator 33 and then integrated in an integrator 37. The output of the integrator 37 is held for a predetermined time period in a sampling and holding circuit 38 from which the output voltage is in turn derived. A reset circuit 34 for resetting the integrator 37 is operated in synch with the output of the oscillator 33. Here, if only the plus portion of the exciting voltage Vin is integrated, in the interval T of FIGS. 8 to 10, the differential output voltage V12 is detected and integrated.

Figure 13:
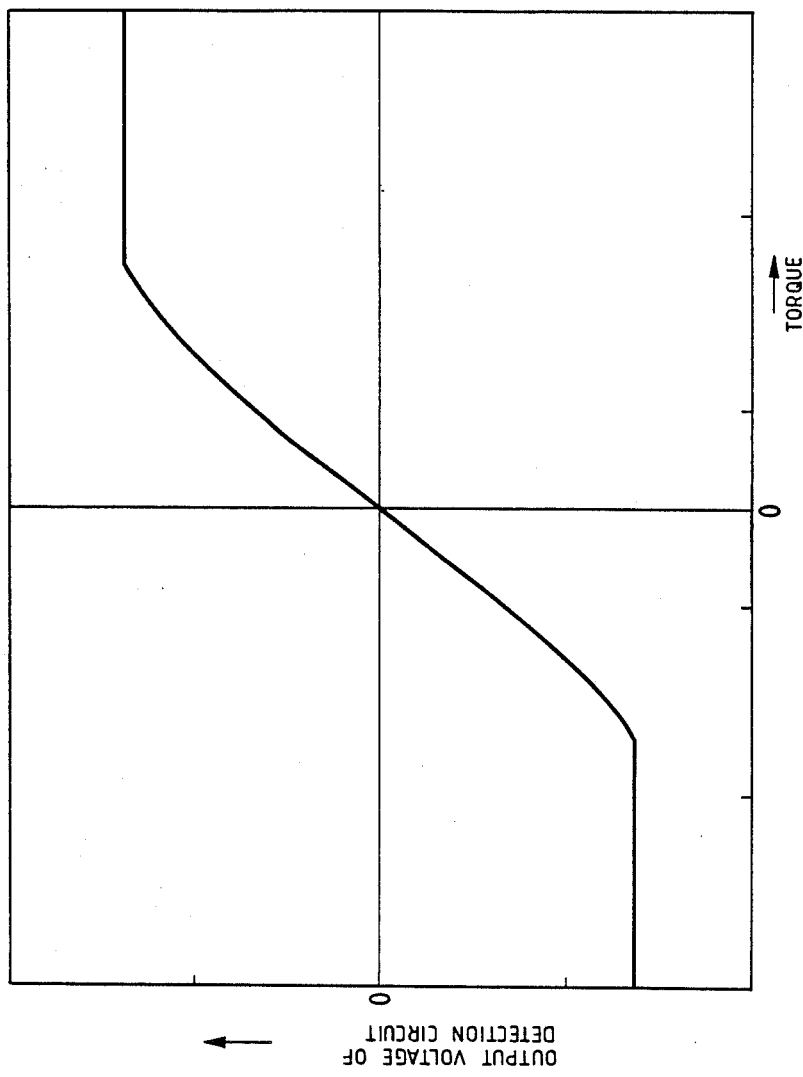
FIG. 13 is a graphic diagram showing the relation between a torque and an output voltage of the detection circuit.

FIG. 13 shows an actually measured value of the output voltage of the detection circuit of FIG. 12, where the horizontal axis represents a torque and the vertical axis represents the output voltage of the detection circuit. Here, the reason that the output voltage is constant with respect to the torque is that the torsion is limited because the stoppers 30, 31 come into contact with each other, and the reason that the output voltage and the torque are in non-linear relation to each other is that the degree of magnetic coupling (permeance) varies in form of a sine wave. Here, provision of the integrator in the detection circuit provides an advantage in terms of protection against introduction of noise. Furthermore, for prevention of noise, it is also appropriate that as well as a conventional differential transformer the winding ratio between the exciting coil and the detection coil is increased up to several times to increase the differential output voltage.

It should be understood that the foregoing relates to only a preferred embodiment of the present invention which is intended to cover all changes and modifications to the embodiment of this invention herein used for the purposes of the disclosure, which do not constitute departures from the spirit and scope of the invention. For example, although in this embodiment a sine wave voltage is used as the exciting voltage, it is also appropriate to use a tooth-shaped wave voltage or a triangle wave voltage Furthermore, although in this embodiment the pitch of the tooth portions of the inner and outer rotors is set to be 36°, it is also allowed that the angle is not limited if it is over two times of the maximum torsion angle of the torsion bar, i.e., the angle by which the stoppers 30, 31 come into contact with each other. In addition, the configuration of each of the tooth portions of the inner and outer rotors is not limited if it causes variation of the magnetic resistance. Furthermore, the torque detection apparatus is allowed to be arranged such that the outer rotor is provided on the drive shaft and the inner rotor is provided on the output shaft.

Furthermore, although in the above-mentioned embodiment the tooth portions of each of the magnetic bodies of the inner rotor is shifted by 18° in phase with respect to that of the other magnetic body and the tooth portions of the magnetic bodies of the outer rotor are coincident in phase with each other, it is also appropriate that, if the degree of magnetic coupling of one of the magnetic circuits is increased and the degree of magnetic coupling of the other magnetic circuit is decreased, the tooth portions of the inner rotor are equal in phase to each other and the tooth portions of one of the magnetic bodies of the outer rotor are shifted by ½ pitch in phase with respect to that of the other magnetic body. In addition, although in the above-mentioned embodiment the magnetic bodies 11-b and 12-b of the inner and outer rotors are respectively shaped cylindrically so that the magnetic resistance is not varied in response to twisting of the torsion bar, it is also appropriate that one of them is arranged to have tooth portions, because the magnetic resistance is not varied thereby. That is, the inner rotor can be arranged so as to have only one cylindrical body which is toothed in a pitch of 36° and whose axial length is equal to the axial total length of the three magnetic bodies 11-a, 11-b and 11-c, if the outer rotor is arranged such that the magnetic bodies 12-a, 12-c. of the outer rotor are different in phase from each other and the cylindrical magnetic body 12-b is provided therebetween as shown in FIG. 5. Furthermore, although in the above description only the plus portion of the exciting voltage Vin is integrated, it is also appropriate to integrate only the minus portion thereof or both the plus and minus portions thereof. Furthermore, it is also appropriate that a magnet is used as the magnetic field supply means and a Hall element or a magnetic resistance element is employed as the signal generating means.

What is claimed is:

1. A torque detection apparatus provided between first and second shafts for measuring a torque applied therebetween, comprising:

an elastic member for coupling between said first and second shafts, the torsion angle of said elastic member corresponding to the relative rotational displacement occurring between said first and second shafts, said first and second shafts being arranged to be in opposed relation to each other so that the axes thereof are coincident with each other;

a first rotating body coupling to said first shaft so as to be rotatable in accordance with rotation of said first shaft, said first rotating body being shaped cylindrically;

a second rotating body directly coupled to said second shaft so as to be rotatable in accordance with rotation of said second shaft, said second rotating body being closely positioned with respect to said first rotating body so that a predetermined space is formed therebetween and being shaped cylindrically and provided coaxially with respect to said first rotating body such that said predetermined space therebetween is formed cylindrically;

magnetic field supply means for causing a magnetic flux to flow through a first magnetic flux path which runs from a portion of said first rotating body through said predetermined space to a portion of said second rotating body and for further causing a magnetic flux to flow through a second magnetic flux path which runs from another portion of said first rotating body through said predetermined space to another portion of said second rotating body, said first magnetic flux path being positioned at the first shaft side and said second magnetic flux path being positioned at the second shaft side;

magnetic flux changing means engaged with said first and second rotating bodies for changing the amounts of the magnetic fluxes flowing through said first and second magnetic flux paths in accordance with a relative rotational displacement occurring between said first and second shafts so that the amount of the magnetic flux flowing through said second magnetic flux path decreases when the amount of the magnetic flux flowing through said first magnetic flux path increases and the amount of the magnetic flux flowing through said second magnetic flux path increases when the amount of the magnetic flux flowing through said first magnetic flux path decreases, said magnetic flux changing means composed of first and second magnetic toothed wheels which are provided in connection with said first magnetic flux path and third and fourth magnetic toothed wheels which are provided in connection with said second magnetic flux path, and further composed of non-toothed magnetic portions, said first and second magnetic toothed wheels being mounted on said first and second rotating bodies, respectively, and said third and fourth magnetic toothed wheels being mounted on said first and second rotating bodies, respectively, said first and second magnetic toothed wheels respectively having pluralities of tooth portions and ones of which are positioned to be in opposed relation to each other and said third and fourth magnetic toothed wheels respectively having pluralities of tooth portions and ones of which are positioned to be opposed relation to each other, the increase and decrease of the magnetic fluxes flowing through said first and second magnetic paths being affected in accordance with the positioning relations between said pluralities of tooth portions of said first and second magnetic toothed wheels and between said pluralities of tooth portions of said third and fourth magnetic tooth wheels which depends upon the degree of the relative rotational displacement occurring between said first and second rotating bodies, said non-toothed magnetic portions being provided between said first and second magnetic toothed wheels and said third and fourth magnetic toothed wheels so as to form a common portion of said first and second magnetic flux paths, and being mounted on said first and second rotating bodies respectively so as to be in opposed relation to each other; and signal generating means for generating a signal indicative of the difference between the amount of the magnetic flux flowing through said first magnetic flux path and the amount of the magnetic flux flowing through said second magnetic flux path, said signal being used to detect the torque applied between said first and second shafts.

2. A torque detection apparatus as claimed in claim 1, wherein said magnetic field supply means and said signal generating means are constructed as a differential transformer including exciting coil means and detection coil means, said magnetic field supply means corresponding to said exciting coil means and said signal generating means corresponding to said detection coil means, said differential transformer being arranged so as to obtain a differential output voltage of output voltages of said detection coil means produced in response to an exciting voltage of said exciting coil means.

3. A torque detection apparatus as claim in claim 2, wherein said differential transformer is positioned around said second rotating body so that a second predetermined space is formed cylindrically therebetween, said differential transformer comprising a core having a E-shaped cross-section and said detection coil means are respectively provided in recess portions of said core.

4. A torque detection apparatus as claimed in claim 3, further comprising stopper means provided between said first and second shafts for limiting the torsion angle of said elastic member up to a predetermined value so that said first and second shafts are directly coupled to each other.

5. A torque detection apparatus as claimed in claim 1 wherein said pluralities of toothed portions of said first and third magnetic toothed wheels on said first rotating body are shifted in position by a predetermined rotational angle from each other, said first magnetic flux path running through said toothed portions of said first magnetic toothed wheel, said predetermined space and said tooth portions of said second magnetic toothed wheel and said second magnetic flux path running through said toothed portions of said third magnetic toothed wheel, said predetermined space and said tooth portions of said fourth magnetic toothed wheel.

* * * * *